(12) United States Patent
Hwang et al.

(10) Patent No.: US 9,147,281 B2
(45) Date of Patent: Sep. 29, 2015

(54) RENDERING APPARATUS AND METHOD FOR GENERATING MULTI-VIEWS

(75) Inventors: Kyu Young Hwang, Hwaseong-si (KR); Ho Young Lee, Suwon-si (KR); Yang Ho Cho, Hwaseong-si (KR); Young Ju Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 13/218,989

(22) Filed: Aug. 26, 2011

(65) Prior Publication Data

US 2012/0050283 A1     Mar. 1, 2012

(30) Foreign Application Priority Data

Aug. 27, 2010 (KR) .................. 10-2010-0083570

(51) Int. Cl.
*H04N 13/02* (2006.01)
*G06T 15/20* (2011.01)
*H04N 13/00* (2006.01)

(52) U.S. Cl.
CPC ............ *G06T 15/20* (2013.01); *H04N 13/0011* (2013.01); *H04N 13/0275* (2013.01)

(58) Field of Classification Search
USPC .......................................................... 348/46
See application file for complete search history.

(56) References Cited

U.S. PATENT DOCUMENTS

| 2006/0232666 A1 | 10/2006 | Op De Beeck et al. | |
| 2007/0086526 A1* | 4/2007 | Koto et al. | 375/240.16 |
| 2009/0003728 A1 | 1/2009 | Ernst et al. | |
| 2010/0118045 A1 | 5/2010 | Brown et al. | |
| 2011/0001792 A1* | 1/2011 | Pandit et al. | 348/43 |
| 2011/0255592 A1* | 10/2011 | Sung et al. | 375/240.02 |

FOREIGN PATENT DOCUMENTS

| CN | 1272967 C | 8/2006 |
| EP | 0 678 832 A2 | 10/1995 |
| EP | 2 348 733 A2 | 7/2011 |
| JP | 9-27969 A | 1/1997 |
| JP | 2009-124308 A | 6/2009 |
| JP | 2009-528747 A | 8/2009 |
| KR | 10-2006-0019994 | 3/2006 |
| KR | 10-0590025 | 6/2006 |
| KR | 10-2007-0042288 | 4/2007 |
| KR | 10-2007-0061011 | 6/2007 |
| KR | 10-2009-0068980 | 6/2009 |

(Continued)

OTHER PUBLICATIONS

International Search Report dated Mar. 26, 2012 issued in corresponding International Patent Application PCT/KR2011/006285.

(Continued)

*Primary Examiner* — Tracy Li

(74) *Attorney, Agent, or Firm* — NSIP Law

(57) ABSTRACT

A rendering apparatus and method for generating multi-views are provided. A rendering unit may generate a plurality of predicted views by rendering one or more reference views, and a hole aggregating unit may generate a reference hole representing an aggregation of holes existing in each of the predicted views. A hole inpainting unit may inpaint the reference hole, and a multi-view generating unit may remove the holes existing in each of the predicted views using the inpainted reference hole.

22 Claims, 6 Drawing Sheets

(56) References Cited

FOREIGN PATENT DOCUMENTS

| KR | 10-2010-008649 | 1/2010 |
|---|---|---|
| KR | 10-2010-0019927 | 2/2010 |
| WO | WO 2009/111007 A1 | 9/2009 |
| WO | WO 2010/050728 A2 | 5/2010 |

OTHER PUBLICATIONS

Japanese Office Action issued on Mar. 3, 2015 in counterpart Japanese Application No. 2013-525832 (6 pages, in Japanese, with English language translation).

Chinese Office Action mailed Jan. 20, 2015, in Chinese Application No. 201180004611.8 (21 pages in English, 14 pages in Chinese).

Liu, C., "Studies on Image Completion Based on the Large Displacement View," Wanfang Data, 2009 (12 pages).

Tauber, Z. et al., "Review and preview: Disocclusion by inpainting for image-based rendering," IEEE Transactions on Systems, Man, and Cybernetics, Part C: Applications and Reviews, vol. 37, No. 4, Jul. 2007 (pp. 527-540).

Sung J. et al., "Improved View Synthesis Algorithm," International Organisatioin for Standarisation Organisation Internationale De Normalisation, ISO/IEC JTC1/SC29/WG11, Oct. 2008, Busan, Korea (10 pages).

Extended European Search Report mailed Apr. 10, 2015 in European Application No. 11820195.3 (11 pages).

\* cited by examiner

RENDERING APPARATUS AND METHOD FOR GENERATING MULTI-VIEWS

CROSS-REFERENCE TO RELATED APPLICATIONS

This application claims the benefit of Korean Patent Application No. 10-2010-0083570, filed on Aug. 27, 2010, in the Korean Intellectual Property Office, the disclosure of which is incorporated herein by reference.

BACKGROUND

1. Field

One or more example embodiments of the following description relate to a rendering apparatus and method for generating multi-views, and more particularly, to a rendering apparatus and method for generating multi-views that may reduce or eliminate inconsistency between generated views.

2. Description of the Related Art

A stereographic image refers to a three-dimensional (3D) image used to simultaneously provide shape information for depth and space. A 3D display for displaying a 3D image may employ a multi-view scheme of simultaneously outputting at least two images, in order to provide an effect as if the same image is viewed from different directions, namely different viewpoints. Generally, 3D displays appear to be evolving from a stereoscopic display outputting a left and right image to a multi-view display outputting three or more different viewpoints.

When captured images are transmitted to a display apparatus, the display apparatus may generate interpolated images, or extrapolated images from the received images, using the multi-view scheme. In other words, a number of generated images may be greater than a number of actually captured images. Here, an image quality may be degraded due to inconsistency between the captured images and the interpolated and extrapolated images. For example, a same background may be erroneously represented by different colors in two consecutive images. This is because holes existing in each of the two interpolated images may be individually inpainted without taking into consideration all available image pixel data.

SUMMARY

The foregoing and/or other aspects are achieved by providing an apparatus for generating multi-views, the apparatus including a processor to control one or more processor-executable units, a rendering unit to generate a plurality of predicted views by rendering one or more reference views, a hole aggregating unit to generate a reference hole representing an aggregation of holes existing in each of the predicted views, the holes being areas without a pixel value, a hole inpainting unit to inpaint the reference hole, and a multi-view generating unit to remove the holes existing in each of the predicted views, using the inpainted reference hole.

The predicted views may be interpolated views located between two consecutive reference views.

The interpolated views may be consecutive interpolated views.

The hole aggregating unit may generate a reference hole layer including the reference hole, and the reference hole layer may have a same size as each of the interpolated views.

The multi-view generating unit may remove the holes by inserting corresponding portions of the inpainted reference hole into each of the interpolated views.

The predicted views may be extrapolated views located outside of the one or more reference views.

The extrapolated views may be generated by rendering a single reference view.

The hole aggregating unit may generate a reference hole layer including the reference hole, and the reference hole layer may have a same size as each of the extrapolated views.

The multi-view generating unit may remove the holes by inserting corresponding portions of the inpainted reference hole into each of the extrapolated views.

The rendering apparatus may further include a hole detecting unit to detect the holes existing in each of the plurality of predicted views.

The foregoing and/or other aspects are achieved by providing a multi-view generation method including generating, by way of a processor, a plurality of predicted views by rendering one or more reference views, generating a reference hole representing an aggregation of holes existing in each of the predicted views, the holes being areas without a pixel value, inpainting the reference hole, and removing the holes existing in each of the predicted views, using the inpainted reference hole.

The predicted views may be interpolated views located between two consecutive reference views.

The interpolated views may be consecutive interpolated views.

The generating of the reference hole may include generating a reference hole layer including the reference hole, and the reference hole layer may have a same size as each of the interpolated views.

The removing of the holes may include removing the holes by inserting corresponding portions of the inpainted reference hole into the holes of each of the interpolated views.

The foregoing and/or other aspects are achieved by providing a rendering apparatus for generating multi-views, the rendering apparatus including a memory, and a processor configured to generate a reference hole representing an aggregation of holes existing in each of a plurality of predicted views, to inpaint the reference hole, and to remove the holes existing in each of the predicted views, using the inpainted reference hole.

The foregoing and/or other aspects are achieved by providing a multi-view display device including an apparatus for generating multi-views. The multi-view display device includes a processor included in the apparatus for generating multi-views and configured to generate a reference hole representing an aggregation of holes existing in each of a plurality of predicted views, to inpaint the reference hole, and to remove the holes existing in each of the predicted views using the inpainted reference hole, and a multi-view display to display a multi-view image based on the predicted views.

In the multi-view display device, the apparatus for generating multi-views may remove the holes by inserting corresponding portions of the inpainted reference hole into each of the holes of each of the interpolated views.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
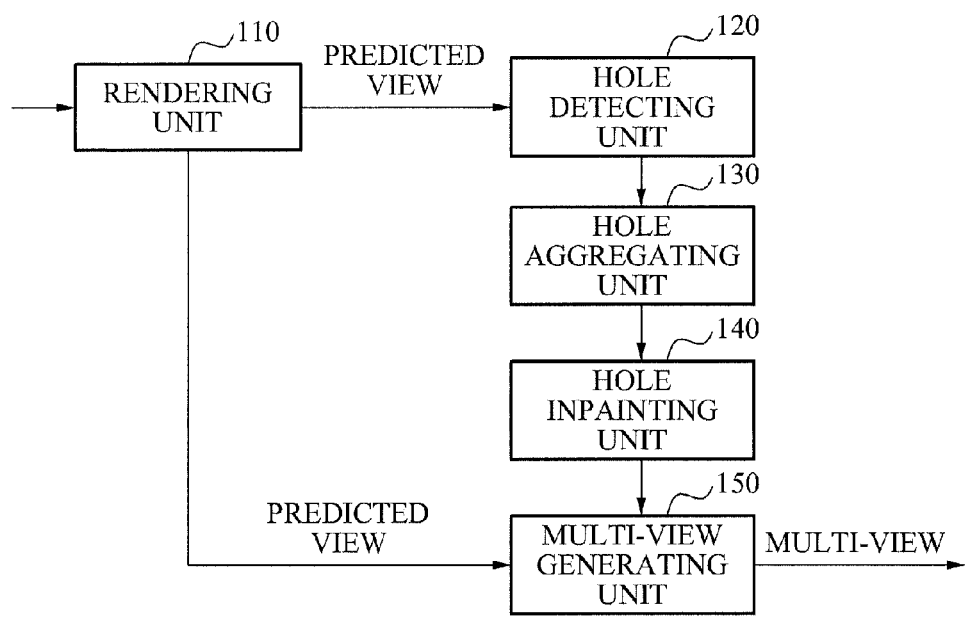
FIG. 1 illustrates a block diagram of a rendering apparatus for generating multi-views according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a rendering apparatus 100 for generating multi-views.

The rendering apparatus 100 of FIG. 1 may be applied to an apparatus for providing a three-dimensional (3D) image using a stereo scheme or a multi-view scheme. The stereo scheme provides a 3D image using left and right images. The multi-view scheme provides a 3D image using images corresponding to at least three different viewpoints.

Referring to FIG. 1, the rendering apparatus 100 may include, for example, a rendering unit 110, a hole detecting unit 120, a hole aggregating unit 130, a hole inpainting unit 140, and a multi-view generating unit 150.

The rendering unit 110 may generate a plurality of predicted views by rendering one or more reference views. The reference views may be acquired by capturing a single image from different locations, and may thereby have different viewpoints. In particular, the rendering unit 110 may generate predicted views by rendering at least one of color values of pixels and a disparity of the pixels in the reference views. The term "disparity" may refer to a difference between two consecutive reference views, and may include, for example a difference in pixel value, a difference in pixel location, and the like.

A predicted view may include an interpolated view generated by an interpolation scheme, and an extrapolated view generated by an extrapolation scheme. The rendering unit 110 may generate an interpolated view based on color values and a disparity of the two reference views. Additionally, the rendering unit 110 may generate an extrapolated view based on a color value of a leftmost reference view or a color value of a rightmost reference view among a plurality of reference views. The leftmost reference view may be located at a leftmost side among the plurality of reference views, and a rightmost reference view may be located at a rightmost side among the plurality of reference views. Accordingly, the extrapolated view may be a view outside the reference views. For example, an extrapolated view generated using a leftmost reference view may correspond to a viewpoint further to the left of the leftmost reference view.

The hole detecting unit 120 may detect holes existing in each of the predicted views generated by the rendering unit 110. A hole may be an area where a pixel value does not exist, or an area where a color value of a pixel is not filled. The predicted views may correspond to viewpoints different from the reference views, and an object in a reference view may seem to be shifted in a predetermine direction in a predicted view, according to the difference in viewpoint. Accordingly, when a background covered by an object in a reference view becomes visible in a predicted view due to a difference in viewpoint, the background may be represented as a hole. Additionally, each of the predicted views may have a hole due to an error caused by the above-described disparity.

The hole aggregating unit 130 may generate a single reference hole layer using holes existing in each of the predicted views. Specifically, the hole aggregating unit 130 may generate a single reference hole layer for each consecutive predicted view among the plurality of predicted views. The reference hole layer may have a same respective size as each view of the predicted views, and may include a reference hole.

To generate a reference hole layer, the hole aggregating unit 130 may use different references depending on whether the predicted views generated by the rendering unit 110 are interpolated views or extrapolated views.

In an example in which a plurality of interpolated views are generated by the rendering unit 110, the hole aggregating unit 130 may generate a single reference hole layer for each consecutive interpolated view among the plurality of interpolated views. The consecutive interpolated views may be located between two consecutive reference views among the plurality of reference views, because the consecutive interpolated views are generated by interpolating the two consecutive reference views.

The hole aggregating unit 130 may generate a reference hole by aggregating holes detected from the plurality of interpolated views. For example, when two reference views are left and right reference views, the rendering unit 110 may generate interpolated views between the left and right reference views. When the hole detecting unit 120 detects holes from the interpolated views, the hole aggregating unit 130 may generate a reference hole by aggregating the detected holes. A reference hole, thus, represents an aggregation of holes from each of the interpolated views. Holes common to two or more interpolated views are counted once during aggregation. Because a reference hole represents a collection of holes in the interpolated views, it may or may not have a contiguous area.

Additionally, the hole aggregating unit 130 may generate a reference hole layer including the generated reference hole. The reference hole layer may have a same size as each of the interpolated views, and the reference hole may have a same size as a largest hole among the detected holes.

In another example in which a plurality of extrapolated views are generated by the rendering unit 110, the hole aggregating unit 130 may generate a single reference hole layer for consecutive extrapolated views among the plurality of extrapolated views. The consecutive extrapolated views may be generated from a leftmost reference view, or from a rightmost reference view, among a plurality of reference views. The hole aggregating unit 130 may generate a reference hole by aggregating holes existing in the consecutive extrapolated views. Like a reference hole for interpolated views, a reference hole for extrapolated views may or may not have a contiguous area.

Additionally, the hole aggregating unit 130 may generate a reference hole layer including the generated reference hole. The reference hole layer may have a same size as each respective view of the extrapolated views.

The hole inpainting unit 140 may inpaint the reference hole of the reference hole layer generated by the hole aggregating unit 130, based on known pixel information. For example, the hole inpainting unit 140 may inpaint a reference hole using a known inpainting scheme.

Figure 2:
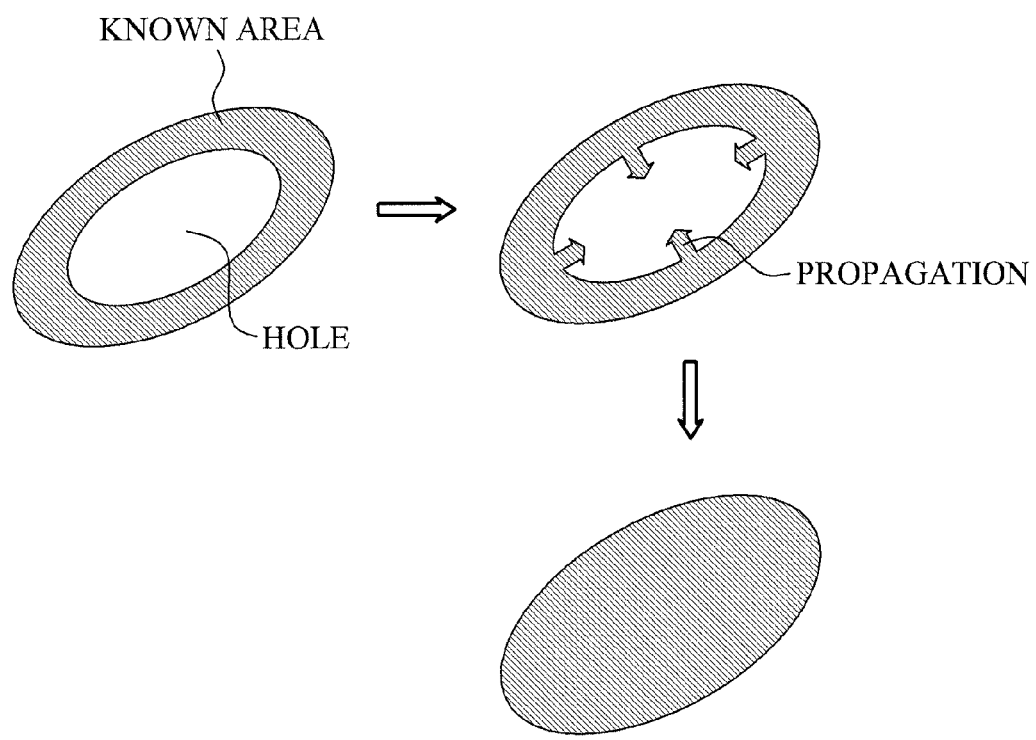
FIG. 2 illustrates a diagram of an inpainting scheme.

FIG. 2 illustrates an example of an inpainting scheme. Referring to FIG. 2, the inpainting scheme fills a hole with a pixel value by propagating the pixel value of a known area surrounding the hole.

In an inpainting scheme, Equation 1 may be used to predict a pixel value of a pixel in a hole.

$$I_q(p)=I(q)+\nabla I(q)(p-q) \quad \text{[Equation 1]}$$

In Equation 1, q denotes a coordinate of a pixel in a known area, p denotes a coordinate of a pixel in a hole, I denotes a pixel value, and $\nabla$ denotes a gradient. In other words, the hole inpainting unit 140 may inpaint the hole using a coordinate p of a pixel, a coordinate q of a neighboring pixel, and a pixel value I(q) of the neighboring pixel.

Alternatively, to obtain a pixel value at a coordinate p, the hole inpainting unit 140 may inpaint a hole using all pixel values of the known area, using Equation 2 as below.

$$I(p) = \frac{\sum_{q \in B_\varepsilon} w(p,q)[I(q) + \nabla I(q)(p-q)]}{\sum_{q \in B_\varepsilon}} \quad \text{[Equation 2]}$$

In Equation 2, $B_\varepsilon$ denotes a known area where a coordinate q is located, and w(p,q) denotes a relative weighted value. w(p,q), as a weighted value applied to all coordinates in the known area, may have different values for each coordinate p.

In addition to the above-described inpainting schemes, the hole inpainting unit 140 may inpaint a hole using other known inpainting schemes, such as an exemplar-based inpainting scheme using a sample in an image to inpaint the image.

The multi-view generating unit 150 may fill the holes existing in each of the predicted views, using a reference hole layer where the reference hole has been inpainted. In an example in which the predicted views are interpolated views, the multi-view generating unit 150 may insert corresponding portions of the reference hole into the holes of each of the interpolated views. Likewise, when the predicted views are extrapolated views, the multi-view generating unit 150 may insert corresponding portions of the reference hole into the holes of each of the extrapolated views. Accordingly, the multi-view generating unit 150 may generate multi-views where the holes in the interpolated and extrapolated views are filled with corresponding portions from the reference hole.

Hereinafter, a method of generating multi-views when predicted views are interpolated views, and a method of generating multi-views when predicted views are extrapolated views will be respectively described with reference to FIGS. 3 and 4.

Figure 3:
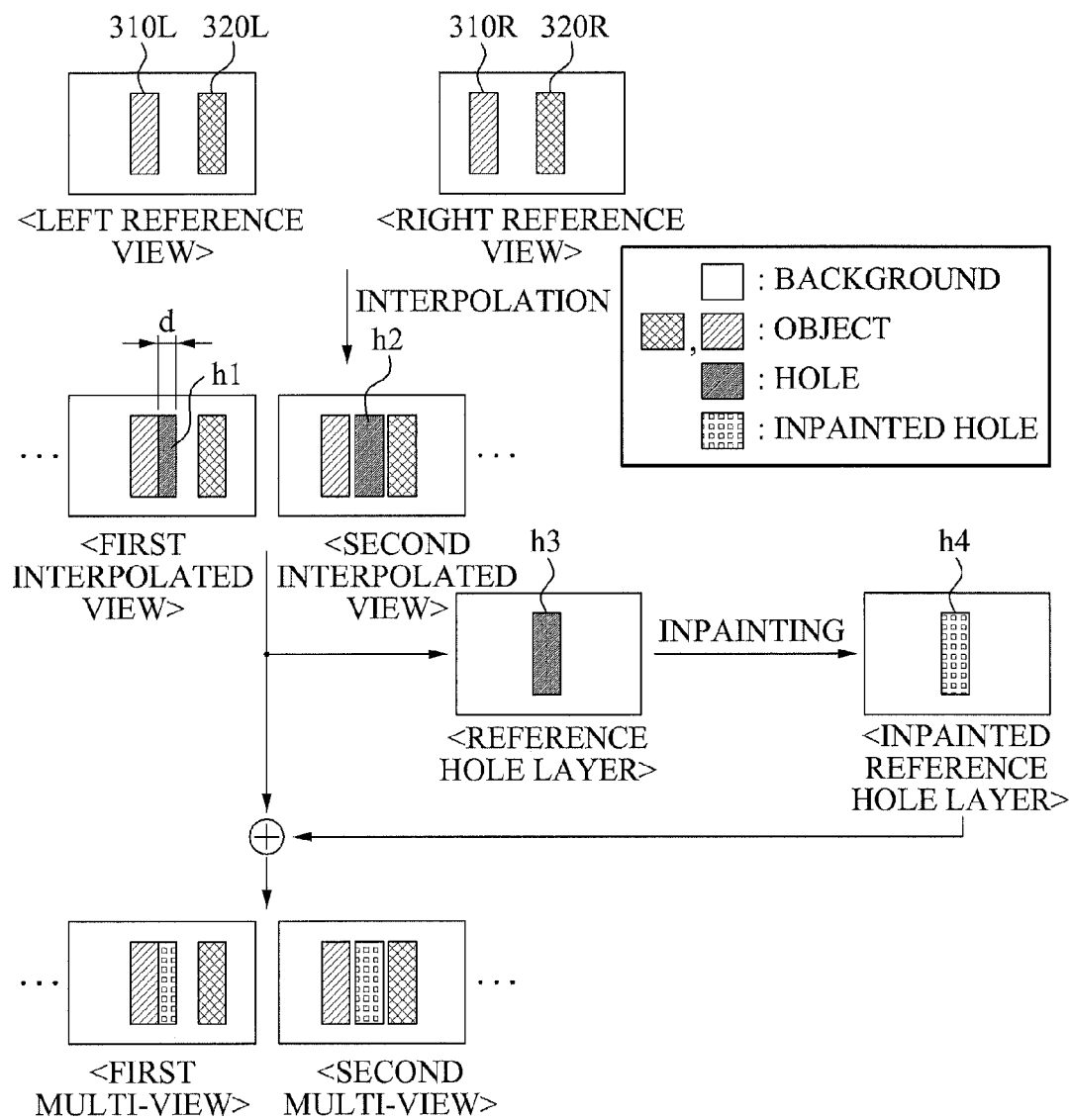
FIG. 3 illustrates a diagram of an example of generating multi-views when predicted views are interpolated views according to example embodiments.

FIG. 3 illustrates an example of generating multi-views when predicted views are interpolated views.

Referring to FIG. 3, a left reference view and a right reference view are consecutive views among a plurality of reference views. The left reference view and the right reference view correspond to different viewpoints, and have a similar background. An object 310L is identical to an object 310R, and an object 320L is identical to an object 320R.

The rendering unit 110 may generate a first interpolated view and a second interpolated view by applying an interpolation scheme to the left reference view and the right reference view. Here, the first interpolated view may show a result that the objects 310L and 320L move to the left by a distance 'd', and accordingly a hole h1 may be formed in the first interpolated view. Additionally, the second interpolated view may show a result that the objects 310R and 320R move to the right, and accordingly a hole h2 may be formed in the second interpolated view.

The hole detecting unit 120 may detect the holes h1 and h2, respectively, from the first interpolated view and the second interpolated view. The hole aggregating unit 130 may generate a reference hole h3 by aggregating the detected holes h1 and h2. During aggregation, areas common in the holes h1 and h2 are counted once. The size of the reference hole h3 thus usually exceeds that of each of the individual holes h1 and h2. In a rare case where the hole h2 entirely covers the hole h1, the size of the reference hole h3 may be the same as that of the hole h2. The hole aggregating unit 130 may generate a reference hole layer including the reference hole h3, and may inpaint the reference hole h3. Accordingly, a reference hole layer including an inpainted reference hole h4 may be generated. The reference hole layer including the inpainted reference hole h4 may be referred to as an inpainted reference hole layer.

The multi-view generating unit 150 may fill the hole h1 by inserting the corresponding portion of the inpainted reference hole h4 into the hole h1 of the first interpolated view. A location of the hole h1 in the first interpolated view may be relatively equal to a location of the corresponding portion of the inpainted reference hole h4 in the inpainted reference hole layer. Accordingly, the multi-view generating unit 150 may fill the hole h1 by inserting, into the hole h1, a pixel value of an area in the inpainted reference hole h4 matched to hole h1, and may generate a first multi-view in which hole h1 is removed. A second multi-view may be generated in the same manner as the first multi-view and accordingly, a further description thereof will be omitted.

Figure 4:
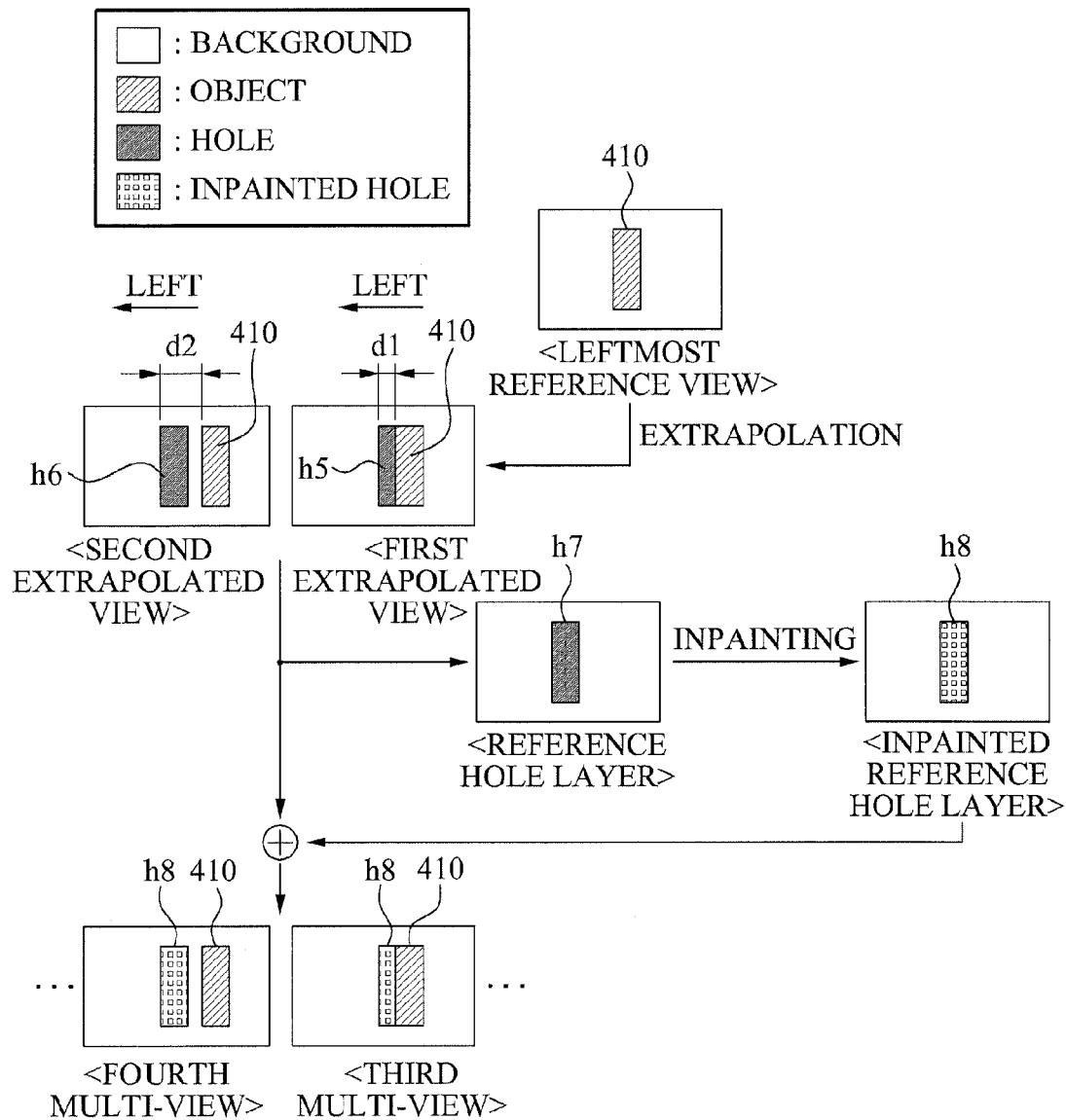
FIG. 4 illustrates a diagram of an example of generating multi-views when predicted views are extrapolated views according to example embodiments.

FIG. 4 illustrates an example of generating multi-views when predicted views are extrapolated views.

Referring to FIG. 4, a leftmost reference view is located in the leftmost side among a plurality of reference views, and includes an object 410. The rendering unit 110 may sequentially generate a first extrapolated view and a second extrapolated view by applying an extrapolation scheme to the leftmost reference view. The first extrapolated view may show a result that the object 410 moves to the right by a distance 'd1' and accordingly, a hole h5 may be formed in the first extrapolated view. Additionally, the second extrapolated view may show a result that the object 410 moves to the right by a distance 'd2' and accordingly, a hole h6 may be formed in the second extrapolated view.

The hole detecting unit 120 may detect the holes h5 and h6, respectively, from the first extrapolated view and the second extrapolated view. The hole aggregating unit 130 may generate a reference hole h7 by aggregating the detected holes h5 and h6. During aggregation, areas common in the holes h5 and h6 are counted once. The reference hole h7 thus usually has a size greater than each of the holes h5 and h6. However, when the hole h6 entirely covers the hole h5, the reference hole h7 may have a same size as the hole h6. The hole aggregating unit 130 may generate a reference hole layer including the reference hole h7, and may inpaint the reference hole h7. Accordingly, an inpainted reference hole layer including an inpainted reference hole h8 may be generated.

The multi-view generating unit 150 may fill the hole h5 by inserting the corresponding portion of the inpainted reference hole h8 into the hole h5 of the first extrapolated view, and may generate a third multi-view where the hole h5 is removed. A fourth multi-view may be generated in the same manner as the third multi-view and accordingly, a further description thereof will be omitted.

The rendering apparatus 100 may further include a memory, a processor, and a controller, in order to perform the above-described operations. The processor or the controller may be configured to generate a single reference hole layer using holes existing in each of a plurality of predicted views, to inpaint a reference hole of the generated reference hole layer, and to fill the holes in the predicted views using a reference hole layer where the reference hole is inpainted.

Additionally, when the rendering apparatus 100 is included in a display apparatus, the generated multi-views may be processed into displayable signals, and may be displayed on a screen or display.

Figure 5:
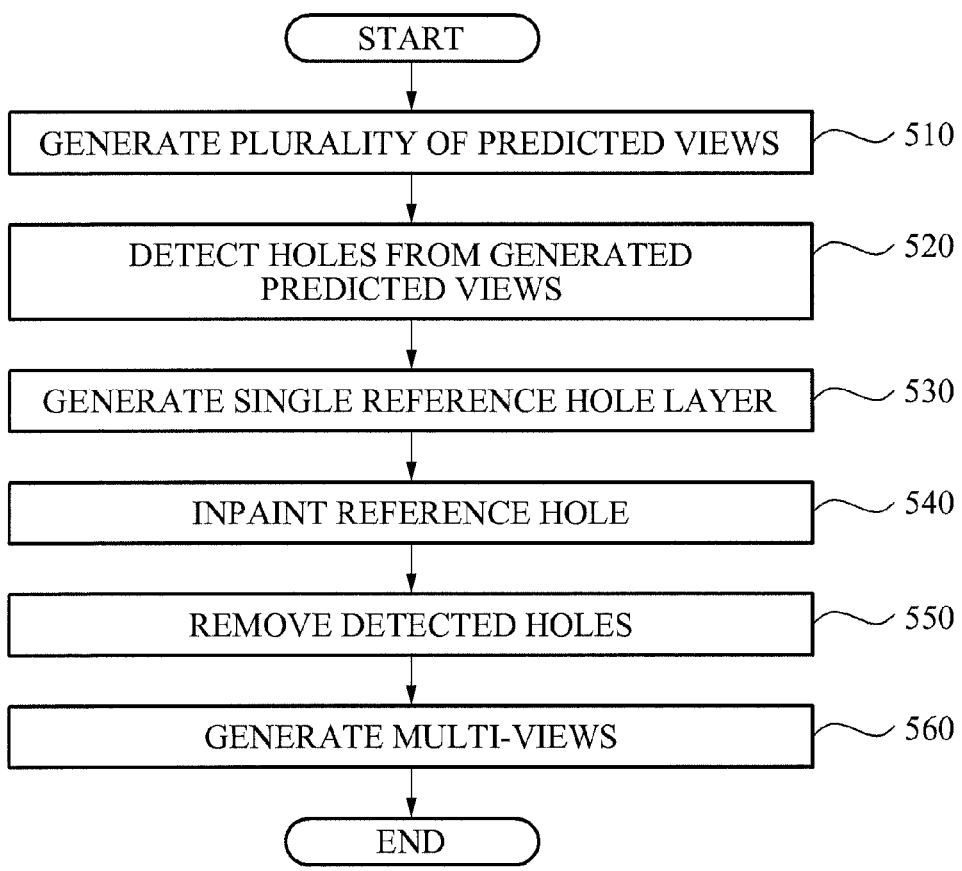
FIG. 5 illustrates a flowchart of a multi-view generation method of a rendering apparatus according to example embodiments.

FIG. 5 illustrates an example of a multi-view generation method.

The multi-view generation method of FIG. 5 may be implemented or performed by the rendering apparatus 100 of FIG. 1, or by the processor or controller in the rendering apparatus 100.

In operation 510, a rendering apparatus may generate a plurality of predicted views by rendering one or more reference views, or by rendering color values and a disparity of the one or more reference views. The predicted views may be either interpolated views generated using an interpolation scheme, or extrapolated views generated using an extrapolation scheme, or a combination of both the interpolated views and the extrapolated views.

In operation 520, the rendering apparatus may detect holes from the plurality of predicted views.

In operation 530, the rendering apparatus may generate a single reference hole by aggregating the detected holes, and may generate a single reference hole layer including the reference hole. Here, the rendering apparatus may generate a single reference hole layer for each consecutive predicted view among the plurality of predicted views.

The reference hole layer may have a same respective size as each view of the predicted views. The reference hole may have a size greater than each of the holes in the predicted views. When no holes are common in any of the predicted views, the reference hole may have a size equal to the sum of each of the holes in the predicted views. In a rare case where the holes in one of the predicted views entirely cover the holes in the other predicted views, the reference hole may have a size equal to the sum of the holes in the one predicted view. Because the reference hole represents a collection of holes, it may or may not have a contiguous area.

In operation 540, the rendering apparatus may inpaint the reference hole of the reference hole layer.

In operation 550, the rendering apparatus may remove the detected holes from each of the predicted views, by inserting the corresponding portions of the inpainted reference hole into the holes of the predicted views.

In operation 560, the rendering apparatus may generate multi-view where the holes are removed from each of the predicted views.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for controlling generating multi-views described herein.

Figure 6:
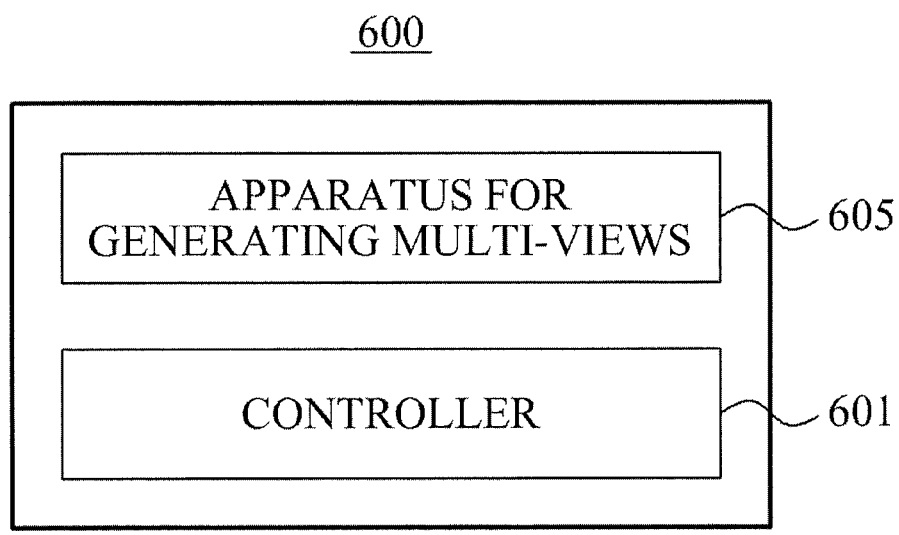
FIG. 6 illustrates a block diagram of a multi-view display device including an apparatus for generating multi-views according to example embodiments.

FIG. 6 illustrates a multi-view display device 600 including an apparatus for generating multi-views according to example embodiments.

Referring to FIG. 6, the multi-view display device 600 may include, for example, a controller 601 and an apparatus for generating multi-views 605.

The multi-view display device 600 may be in the form of a 3D display for displaying a 3D image and may employ a multi-view scheme to output three or more different viewpoints. Alternatively, the multi-view display device 600 may be in the form of a stereoscopic display outputting a left and right image.

The controller 601 may generate one or more control signals to control the multi-view display device 600 and to be displayed by the multi-view display device 600. The controller 601 may include one or more processors.

The apparatus for generating multi-views 605 may be used to generate a multi-view image for the multi-view display device 600 and may include, for example, a rendering unit 610, a hole detecting unit 620, a hole aggregating unit 630, a hole inpainting unit 640, and a multi-view generating unit 650. None of items 610-650 are illustrated in FIG. 6. However, each of these units may correspond to similarly named units discussed herein, for example with respect to FIG. 1, and therefore need not be discussed further here.

The apparatus for generating multi-views 605 may be installed internally within the multi-view display device 600, may be attached to the multi-view display device 600, or may be separately embodied from the multi-view display device 600. Regardless of its physical configuration, the apparatus for generating multi-views 605 has all of the capabilities discussed herein. The apparatus for generating multi-views 605 may include one or more internal processors or may be included by the one or more processors included within the multi-view display device 600 such as the one or more processors of controller 601.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for generating multi-views, the apparatus comprising:
   a rendering unit configured to generate predicted views by rendering one or more reference views;
   a hole aggregating unit configured to generate a reference hole layer comprising a first hole existing in a first one of the predicted views and a second hole existing in a second one of the predicted views;
   a hole inpainting unit configured to inpaint the reference hole layer; and
   a multi-view generating unit configured to remove the first and second holes existing in the respective first and second ones of the predicted views, using the inpainted reference hole layer.

2. The apparatus of claim 1, wherein the predicted views are interpolated views located between two consecutive reference views.

3. The apparatus of claim 2, wherein the interpolated views are consecutive interpolated views.

4. The apparatus of claim 2, wherein the reference hole layer has a same size as each of the interpolated views.

5. The apparatus of claim 1, wherein the multi-view generating unit is configured to remove the first and second holes existing in the respective first and second ones of the predicted views by inserting portions of the inpainted reference hole layer into the respective first and second holes.

6. The apparatus of claim 1, wherein the predicted views are extrapolated views located outside of the one or more reference views.

7. The apparatus of claim 6, wherein the extrapolated views are generated by rendering a single reference view.

8. The apparatus of claim 6, wherein the extrapolated views are consecutive extrapolated views.

9. The apparatus of claim 6, wherein the reference hole layer has a same size as each of the extrapolated views.

10. The rendering apparatus of claim 1, further comprising:
    a hole detecting unit configured to detect the first and second holes existing in the respective first and second ones of the predicted views.

11. A multi-view generation method comprising:
    generating, by a processor, predicted views by rendering one or more reference views;
    generating a reference hole layer comprising a first hole existing in a first one of the predicted views and a second hole existing in a second one of the predicted views;
    inpainting the reference hole layer; and
    removing the first and second holes existing in the respective first and second ones of the predicted views, using the inpainted reference hole layer.

12. The multi-view generation method of claim 11, wherein the predicted views are interpolated views located between two consecutive reference views.

13. The multi-view generation method of claim 12, wherein the interpolated views are consecutive interpolated views.

14. The multi-view generation method of claim 12, wherein the reference hole layer has a same size as each of the interpolated views.

15. The multi-view generation method of claim 11, wherein the removing of the first and second holes comprises removing the first and second holes existing in the respective first and second ones of the predicted views by inserting portions of the inpainted reference hole layer into the respective first and second holes.

16. The multi-view generation method of claim 11, wherein the predicted views are extrapolated views located outside of the one or more reference views.

17. The multi-view generation method of claim 16, wherein the extrapolated views are generated by rendering a single reference view.

18. The multi-view generation method of claim 16, wherein the extrapolated views are consecutive extrapolated views.

19. The multi-view generation method of claim 16, wherein the reference hole layer has a same size as each of the extrapolated views.

20. A rendering apparatus for generating multi-views, the rendering apparatus comprising:
    a memory; and
    a processor configured to
        generate a reference hole layer comprising a first hole existing in a first predicted view and a second hole existing in a second predicted view,
        inpaint the reference hole layer, and
        remove the first and second holes existing in the respective first and second predicted views, using the inpainted reference hole layer.

21. A multi-view display device including an apparatus for generating multi-views, the multi-view display device comprising:
    a processor included in the apparatus for generating multi-views and configured to
        generate a reference hole layer comprising a first hole existing in a first predicted view and a second hole existing in a second predicted view,
        inpaint the reference hole layer, and
        remove the first and second holes existing in the respective first and second predicted views, using the inpainted reference hole layer; and
    a multi-view display configured to display a multi-view image based on the first and second predicted views.

22. The multi-view display device of claim 21, wherein the processor is configured to remove the first and second holes existing in the respective first and second ones of the predicted views by inserting portions of the inpainted reference hole layer into the respective first and second holes.

* * * * *